United States Patent [19]

Desjardins

[11] Patent Number: 4,818,135
[45] Date of Patent: Apr. 4, 1989

[54] LOCKING COLLAR FOR TELESCOPING CYLINDRICAL TUBES

[76] Inventor: Wallace H. Desjardins, 352 Lake Blvd., Lindenwold, N.J. 08021

[21] Appl. No.: 699,219

[22] Filed: Feb. 6, 1985

Related U.S. Application Data

[63] Continuation of Ser. No. 445,673, Nov. 30, 1982, abandoned.

[51] Int. Cl.$^4$ ............................................. E04G 25/02
[52] U.S. Cl. ...................................... 403/104; 248/413
[58] Field of Search ................ 248/413; 403/104, 108, 403/362, 366, 377

[56] References Cited

U.S. PATENT DOCUMENTS

| | | | |
|---|---|---|---|
| 701,669 | 6/1902 | Atkinson | 285/252 |
| 1,309,375 | 7/1919 | Taylor | 248/413 |
| 2,023,263 | 12/1935 | Blume | 285/252 |
| 2,344,309 | 3/1944 | Koch . | |
| 2,472,307 | 6/1949 | Nagel | 403/366 |
| 2,817,548 | 12/1957 | Uthemann . | |
| 3,047,061 | 7/1962 | Wilcox . | |
| 3,604,734 | 9/1971 | Friedman . | |
| 3,955,828 | 5/1976 | Boudreau . | |
| 4,111,575 | 9/1978 | Hoshino | 248/413 |
| 4,140,415 | 2/1979 | Koyamato | 248/413 |
| 4,185,936 | 1/1980 | Takahashi . | |

Primary Examiner—J. Franklin Foss
Assistant Examiner—Robert A. Olson
Attorney, Agent, or Firm—Alexis Barron; Richard D. Weber

[57] ABSTRACT

A locking device for securing inner and outer telescoping cylindrical tubes in a selected relationship. A resilient collar attached to one end of the outer tube includes and inner annular flange extending in close-fitting relation between the inner and outer tubes. A locking screw extending through the outer tube is actuatable to bear against and resiliently circumferentially displace the inner flange to lock the inner tube in the desired position. The device is particularly suited for use with adjustable stands such as hospital IV bottle stands and the like.

11 Claims, 2 Drawing Sheets

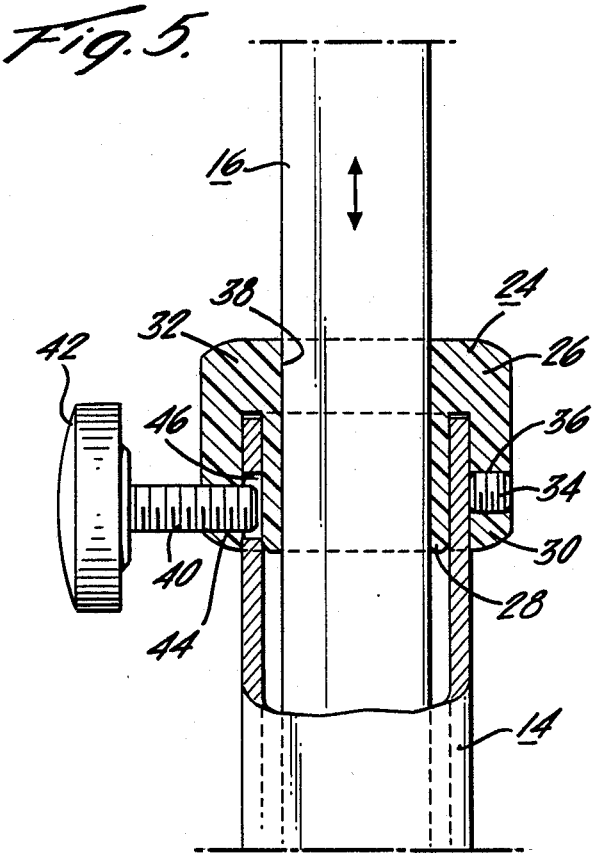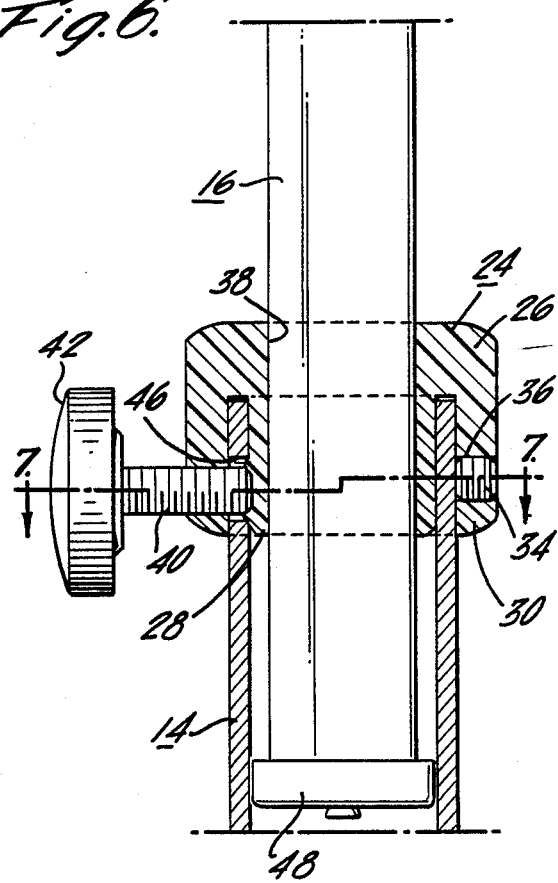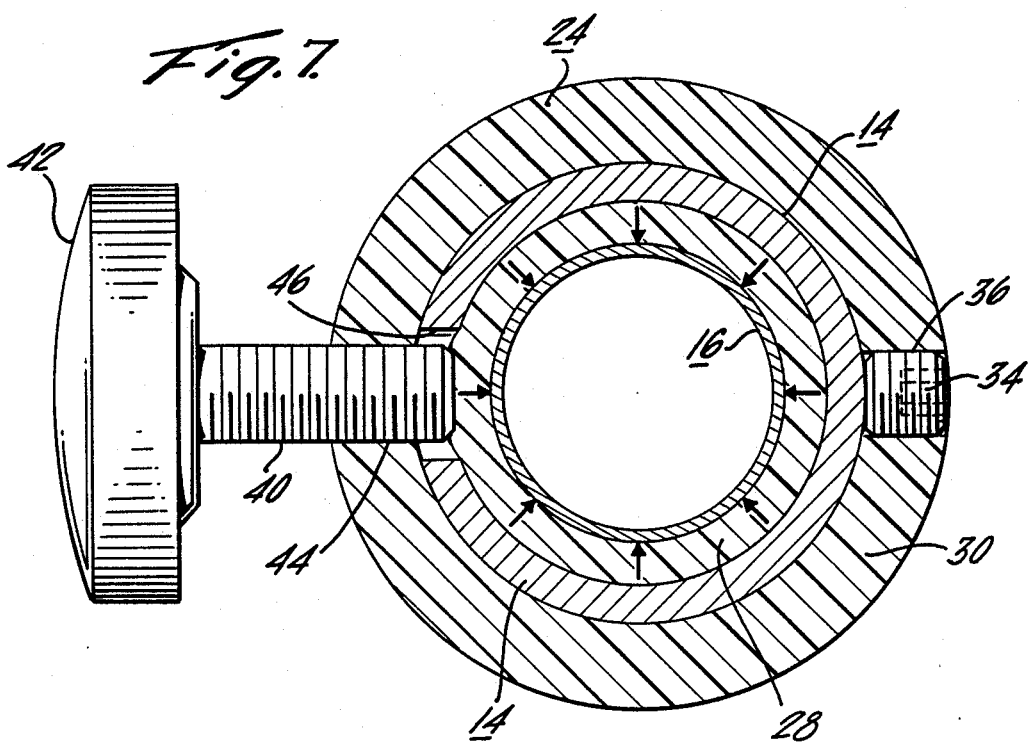

LOCKING COLLAR FOR TELESCOPING CYLINDRICAL TUBES

This is a continuation of co-pending application Ser. No. 445,673, filed on Nov. 30, 1982, now abandoned.

BACKGROUND OF THE INVENTION

The present invention relates generally to locking devices for selectively securing inner and outer telescoping cylindrical tubes in the desired relationship. Particularly, the invention relates to a locking collar for adjusting the height of portable hospital equipment such as stands for IV bottles and the like.

Although the present invention is suited for many other uses, it was developed specifically for use with adjustable IV bottle stands which are characterized by an outer cylindrical tube supported on a roller base, and an inner cylindrical tube having bottle supporting hooks at its upper end which is disposed in telescoping relation within the outer tube. The inner tube is moved to a lower loading position to attach the IV bottles to the bottle hooks, and is then raised to its normal operating height to provide the proper gravity feed to a patient. The present invention comprises a novel locking collar located at the upper end of the outer tube which permits a selective locking of the inner tube in any desired position.

Height-adjustable stands employing telescoping cylindrical tubes have been used for a variety of purposes. Some familiar uses include music stands, camera tripods and light stands. A typical arrangement for adjusting the height of the tubes is a lock screw passing through the outer tube and bearing against the inner tube. Although effective to a degree, such arrangements provide a limited clamping force, often resulting in the slippage of the tubes and sometimes a complete collapse of the mechanism. Furthermore, the screw bearing against the surface of the inner tube will in time have a destructive effect on the tube surface giving an unsightly appearance to the device and eventually interfering with the proper sliding and locking movement of the tubes.

Slippage of the tubes is in most such devices merely an annoyance but in hospital equipment and particularly patient care equipment such as IV stands, the slippage could have serious consequences since the loss of heigh of the supported bottles would diminish the pressure head of the fluid and interfere with its proper delivery to the patient. Accordingly, for hospital use a locking collar is required which provides a non-slip grip of the stand members but which can be readily unlocked and relocked without unreasonable effort.

BRIEF SUMMARY OF THE INVENTION

In the present invention, a resilient locking collar is employed which is placed over the upper end of the outer tube. The collar includes an upper annular body portion from which downwardly depend an inner annular flange and an outer annular skirt. The slot formed between the inner flange and outer skirt is dimensioned to receive the upper end of the outer tube in close fitting relationship. The bore formed by the body portion and inner flange receives the inner tube in close fitting, slidable relation.

A locking screw is disposed within a threaded radial bore in the outer flange adjacent the lower edge thereof and passes through a bore in the outer tube, permitting the locking screw to bear against the outer surface of the inner flange. Upon a tightening movement of the locking screw, the inner flange is compressed and it becomes circumferentially resiliently displaced to provide a clamping force on the inner tube around its entire circumference. A relatively large clamping force may thus be quickly obtained with a relatively small movement of the locking screw. Since the force is directed circumferentially on the inner tube about its entire circumference, a substantial frictional force is created, preventing the sliding movement of the inner tube.

It is accordingly a first object of the present invention to provide a locking collar for telescoping cylindrical tubes which provides a secure locking of the tubes in a selective position with a minimal control force.

Another object of the invention is to provide a locking collar as described which can be quickly and easily unlocked.

A further object of the invention is to provide a locking collar as described which does not mar or deform the inner telescoping tube.

A further object of the invention is to provide a locking collar as described of a one-piece construction which can be molded of a resilient plastic material.

Still another object of the invention is to provide a locking collar as described which is inexpensive to manufacture and is simple to assemble.

Additional objects and advantages of the invention will be more apparent from the following detailed description of a preferred embodiment thereof.

BRIEF DESCRIPTION OF THE DRAWINGS

FIG. 5 is a partial view of the stand of FIG. 1 showing the collar in the unlocked position;

FIG. 6 is a view similar to FIG. 5 showing the collar in the locked position; and FIG. 7 is an enlarged view taken along line 7—7 of FIG. 6 showing the manner in which the locking forces are circumferentially directed against the inner tube by the displacement of the resilient inner flange.

DESCRIPTION OF THE PREFERRED EMBODIMENT

Figure 1:
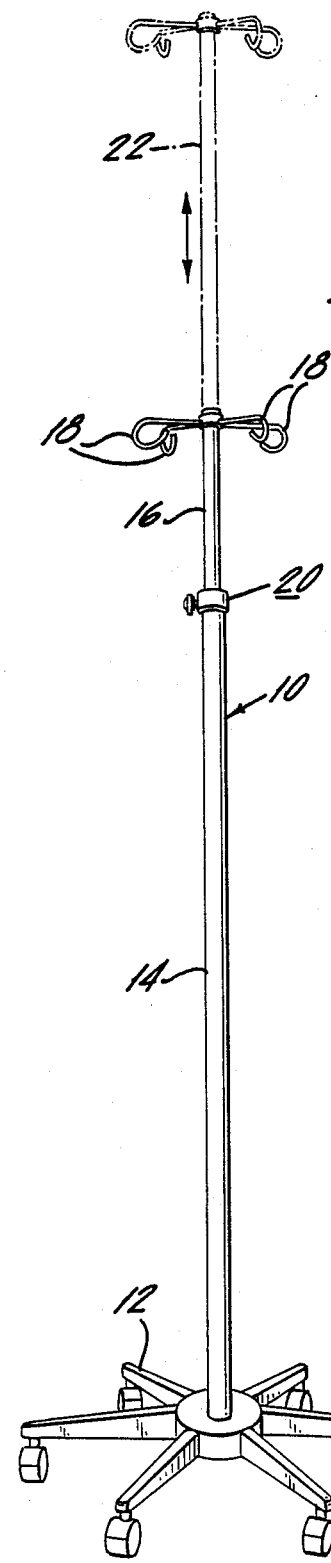
FIG. 1 is a perspective view of a hospital IV bottle stand utilizing a locking collar in accordance with the present invention.
Figure 2:
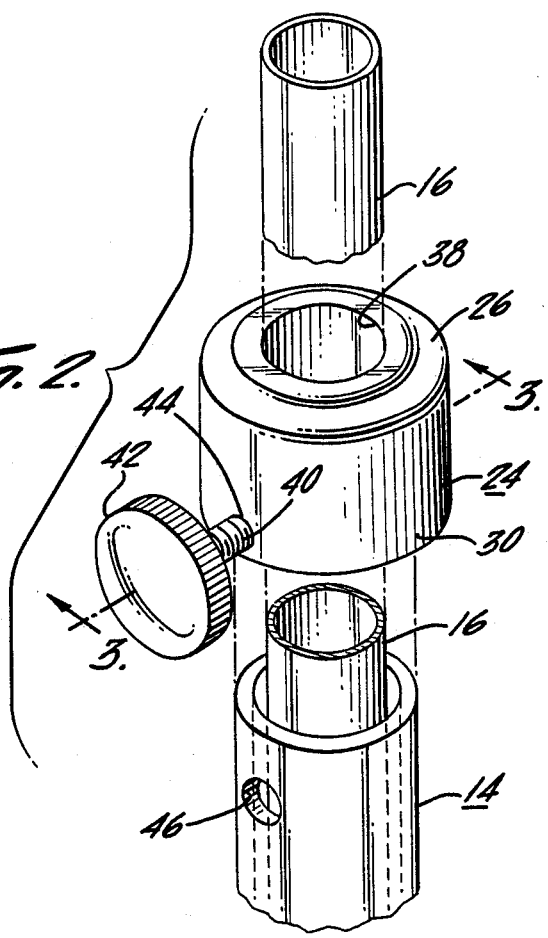
FIG. 2 is an enlarged perspective exploded view of a portion of the stand shown in FIG. 1 and illustrating the relationship of the locking collar and the inner and outer telescoping tubes.

Referring to the drawings and particularly FIG. 1 thereof, an IV bottle stand generally designated 10 is illustrated which includes a roller base 12, an outer tube 14 attached to the base 12, and an inner tube 16 disposed in telescoping relation within the tube 14 and carrying at the upper end thereof a plurality of arms or hooks 18 for attachment of one or more IV or infusion bottles. A locking collar assembly 20 which is the subject of the present invention is provided to selectively lock the inner tube 16 in the desired position which is normally an elevated position such as that illustrated at 22 in dot/dash lines. In this position the bottles (not shown) are supported at a sufficient height to provide the proper pressure head required to effect a gravity flow of the contained fluids to the patient. For attachment or detachment of the bottles, or for storage of the stand, the tube 16 may be lowered to a position such as shown in solid lines in FIG. 1 wherein the bottle hooks 18 are within easy reach. Aside from the locking collar assembly to be described, the stand 10 is of a generally conventional construction.

Figure 3:
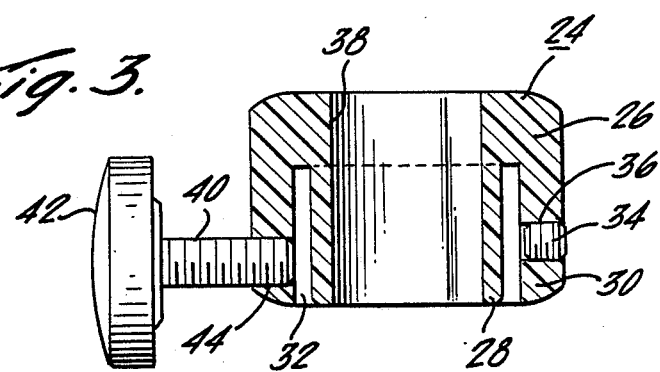
FIG. 3 is an enlarged sectional view taken through the locking collar along line 3—3 of FIG. 2.
Figure 4:
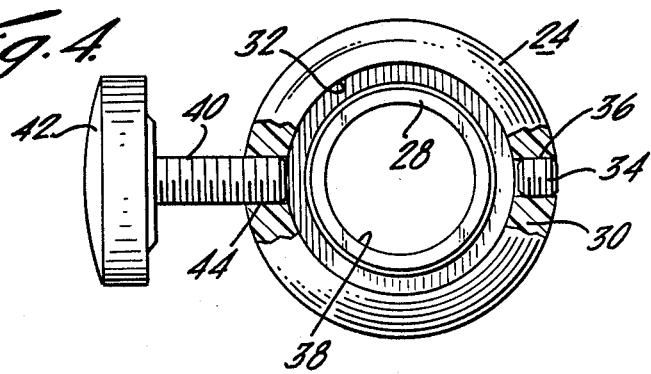
FIG. 4 is a bottom view of the locking collar assembly shown in FIG. 3.

The locking collar assembly 20 as shown most clearly in FIGS. 3 and 4 includes a resilient locking collar 24 comprising an annular body portion 26 having an annular inner flange 28 and an annular outer skirt 30 extending downwardly therefrom. The flange 28 and skirt 30 define an annular slot 32 therebetween which is sized to permit the entrance thereinto of the upper end of the outer tube 14 in close-fitting relation. A set screw 34 is threadedly engaged in a radial bore 36 of the skirt 30 and as shown in FIGS. 5–7 is tightened to secure the collar 24 to the upper end of the outer tube 14.

An inner bore 38 in the collar 24 defined by the body portion 26 and the inner flange 28 is slightly larger than the diameter of the inner tube 16 and thus permits a sliding movement of the inner tubes therethrough. The bore 38 is dimensioned to provide a close fit of the inner tube for reasons which will become apparent.

A locking screw 40 having a knurled actuating knob 42 on the outer end thereof is threadedly engaged in a radial bore 44 in the skirt 30 near the lower edge thereof. The outer tube 14 includes a radial bore 46 having a larger diameter than the screw 40 and aligned with the screw 40 to allow free passage thereof.

For use, the locking collar assembly is attached to the upper end of the tube 14 in the manner shown in FIG. 5 with the bore 46 aligned with and receiving the screw 40. The set screw 34 is then tightened to secure the collar 24 to the tube. With the locking screw 40 disengaged from or in only light contact with the inner flange 28, the inner tube 16 may be freely moved with respect to the outer tube 14 to the desired position, the collar 24 and specifically the bore 38 thereof providing ample bearing support for the tube 16 to permit a smooth slidable extension or retraction of the tube.

When the desired position of the inner tube 16 has been selected, the screw 40 is rotated by means of the knob 42 to bear against the inner flange 28 to thereby resiliently displace a portion of the flange as shown in FIG. 7. The resilient nature of the flange material causes a displacement and radial expansion of the flange around its entire circumference. However, the close fitting outer tube prevents any outward expansion of the inner flange and accordingly the radial expansion must take place inwardly, thus expanding into and eliminating the small clearance between the inner tube and the inner flange and producing a tight grip of the inner flange on the inner tube. This locking effect may be achieved with a surprisingly small displacement of the screw. A half turn of the screw and a modest turning force is generally sufficient with the preferred embodiment disclosed although this will depend of course on the size and pitch of the screw and other factors including the collar material and the amount of clearance provided between the inner flange and the inner tube.

For release of the locking collar assembly, the screw 40 is simply rotated from its locked position and the resilient inner flange will recover from its elastic deformation and immediately permit the sliding movement of the inner tube 16.

It may be desirable, as in the case of the bottle stand shown in FIG. 1, to provide means for preventing the separation of the inner tube 16 from the outer tube 14 by overextension of the inner tube. Such means is shown in FIG. 6 and comprises a plug (not shown) within the lower end of the inner tube to which is secured a stop member 48 which has a diameter larger than that of the inner tube and will thus engage the inner flange 28 at the upper limit of movement of the tube to prevent the disassembly of the tubes. The stop member 48 also serves as a guide to maintain the inner tube in coaxial alignment within the outer tube, particularly during the adjustment of the tube when the locking collar is in an unlocked condition.

Although other resilient materials having the requisite resilient properties for carrying out the described function may be used, the coller 24 in th preferred embodiment is made of a resilient plastic material and particularly a styrene polymer known commercially as ABS (acrylonitrilebutadiene-styrene). Excellent results have been obtained with glass-fortified ABS which includes 201 % fiber glass. Properties of this material are as follows:

| Property | ASTM Method | Units | |
|---|---|---|---|
| Specific Gravity | D792 | — | 1.20 |
| Specific Volume | D792 | in.$^3$/lb. | 23.1 |
| Tensile Strength | | | |
| at 73° F. | D638 | psi | 13,500 |
| at 140° F. | D638 | psi | 8,500 |
| Tensile Elongation | D638 | % | 3–4 |
| Flexural Strength | D790 | psi | 17,500 |
| Flexural Modulus | | | |
| at 73° F. | D790 | psi | 850,000 |
| at 140° F. | D790 | psi | 800,000 |
| Compressive Strength | D695 | psi | 13,500 |
| Shear Strength | D732 | psi | 7,000 |
| Impact Strength, Izod | D256 | ft. lb./in. | |
| Notched ¼" bar | | | 1.5 |
| Unnotched ¼" bar | | | 6.7 |
| Rockwell Hardness | D785 | — | R124,M97 |

Although the inner telescoping member has been described as a tube, such as the tube 16, it will be apparent that this member could also be a solid rod, particularly in smaller sized embodiments of the invention. In practice, stands of the type described are conventionally comprised of a pair of telescoping tubes and the invention has accordingly been described in such context.

Although the means for securing the collar to the outer tube comprises in the illustrated embodiment of set screw, it will be obvious that other means could suitably be employed including other types of mechanical fastenings as well as adhesives.

In a slightly modified form of the collar assembly, the screw 40 could be threaded into the uter tube rather than the collar skirt, in which case the skirt could include a larger bore to receive the screw, a slot to pass around the screw, or the skirt may be shortened to terminate above the screw. It is, however, preferred that the screw be threaded to the lower edge of the skirt rather than the inner tube. This is particularly true since the invention due to its circumferential locking action permits the use of relatively thin walled tubing for both the inner and outer tubes without danger of collapsing the tubes and thin walled tubing is not well suited to threadedly receive a locking screw.

From the foregoing it may be appreciated that the present invention provides a simple and inexpensive but extremely effective locking device for selectively securing telescoping tubular members. The device is especially well suited for hospital apparatus such as IV bottle stands since a secure locking effect can be achieved with a relatively small effort. Aside from the screws, the device is essentially a one-piece collar which can be easily molded from a suitable plastic material.

Manifestly, changes in details of construction can be effected by those skilled in the art without departing from the spirit and scope of the invention.

I claim

1. A locking device for selectively locking an adjustable inner cylindrical member in a desired position within a cylindrical tubular outer member, said device comprising a one-piece molded resilient plastic collar disposed at one end of said outer member, said collar including a resilient uninterrupted cylindrical flange disposed in close-fitting relation between said outer tube and said inner member, and screw means extending through said outer tube and selectively actuatable to bear directly against and effect a substantial circumferential resilient displacement of said resilient flange and a consequent frictional engagement of said flange with said inner member to lock said inner member in a selected position.

2. A locking collar assembly for telescoping inner and outer cylindrical tubes, said collar assembly comprising a one-piece molded resilient plastic collar, said resilient collar including an annular body portion having an uninterrupted cylindrical inner flange and an outer skirt extending axially therefrom in concentric relation therewith, said inner flange and said body portion defining therewithin an axial bore having a diameter slightly larger than the diameter of said inner tube, said inner flange and said skirt portion defining therebetween an annular slot for receiving one end of said outer tube in close-fitting relation therewith, means for securing said collar to said outer tube, screw means extending through said outer tube and selectively actuatable to be directly against and effect a substantial circumferential resilient displacement of said inner flange, and a consequent frictional engagement of said inner flange with said inner tube to lock said inner tube in a selected position with respect to said outer tube.

3. The invention as claimed in claim 2 wherein said outer skirt is substantially axially coextensive with said inner flange.

4. The invention as claimed in claim 3 wherein said screw means comprises a locking screw threadedly engaged within a radial bore of said skirt.

5. The invention as claimed in claim 2 wherein said resilient collar comprises a molded styrene polymer.

6. The invention as claimed in claim 5 wherein said resilient collar is made from acrylonitrile-butadiene-styrene.

7. In a portable adjustable bottle stand comprising a roller base, a vertical cylindrical outer tube attached at its lower end of said base, an inner tube adjustably slideably disposed within said outer tube, and means on said inner tube for supporting at least one bottle in an elevated position, the improvement comprising a one-piece molded plastic locking collar assembly for selectively adjusting the height of said inner tube, said collar assembly comprising a resilient collar at the upper end of said outer tube, said resilient collar including an annular body portion having an uninterrupted cylindrical resilient inner flange and an outer skirt portion extending downwardly therefrom in concentric relation therewith, said inner flange and said body portion defining therewithin an axial bore having a diameter slightly larger than the diameter of said inner tube for slidably receiving said inner tube, said inner flange and said skirt portion defining therebetween an annular slot for receiving the upper end of said outer tube in close fitting relation therewith, means for securing said collar to said outer tube, and screw means extending through said outer tube and selectively actuatable to bear directly against and effect a substantial circumferential resilient displacement of said inner flange and a consequent frictional engagement of said inner flange with said inner tube to lock said inner tube in a selected position with respect to said outer tube.

8. The invention as claimed in claim 7 wherein said outer skirt is substantially axially coextensive with said inner flange.

9. The invention as claimed in claim 8 wherein said screw means comprises a locking screw threadedly engaged within a radial bore of said skirt.

10. The invention as claimed in claim 7 wherein said resilient collar comprises a molded sytrene polymer.

11. The invention as claimed in claim 10 wherein said resilient collar is made from acrylonitrile-butadiene-sytrene.

* * * * *